Nov. 19, 1940.  C. J. GREEN  2,222,563
MACHINE TOOL
Filed Jan. 13, 1939  2 Sheets-Sheet 1

Inventor
CLARENCE J. GREEN
By George Champ Jr.
Attorney

Nov. 19, 1940.  C. J. GREEN  2,222,563
MACHINE TOOL
Filed Jan. 13, 1939   2 Sheets-Sheet 2

Inventor
CLARENCE J. GREEN

Patented Nov. 19, 1940

2,222,563

UNITED STATES PATENT OFFICE 2,222,563

MACHINE TOOL

Clarence J. Green, Worcester, Mass., assignor to Norton Company, Worcester, Mass., a corporation of Massachusetts Application January 13, 1939, Serial No. 250,782

4 Claims. (Cl. 51—101)

The invention relates to machine tools, and more specifically to machine tools for producing other than circular work pieces. In the preferred form the invention is embodied in a grinding machine.

One object of the invention is to provide a machine for the shaping of non-circular objects whereby the generating cam used has a more exaggerated shape than that of the work piece. Another object of the invention is to provide a grinding machine for the grinding of automotive pistons to non-circular shapes with a high degree of accuracy. Another object of the invention is to provide a machine involving a rock shaft and a master cam to generate special shaped work pieces which has an easier action than previous machines. Another object of the invention is to provide a grinding machine for the grinding of many different shapes such as lifting cams, elliptical pistons, breaker cams, trilobe shafts and the like. Another object of the invention is to provide a grinder with one or more of the characteristics indicated above in which the master cam can be quickly shaped from a sample work piece. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

In the accompanying drawings showing one of many possible embodiments of the mechanical features of this invention, Figure 1 is a front elevation of a grinding machine embodying the invention, Figure 2 is a plan view of the attachment;

Figure 1:
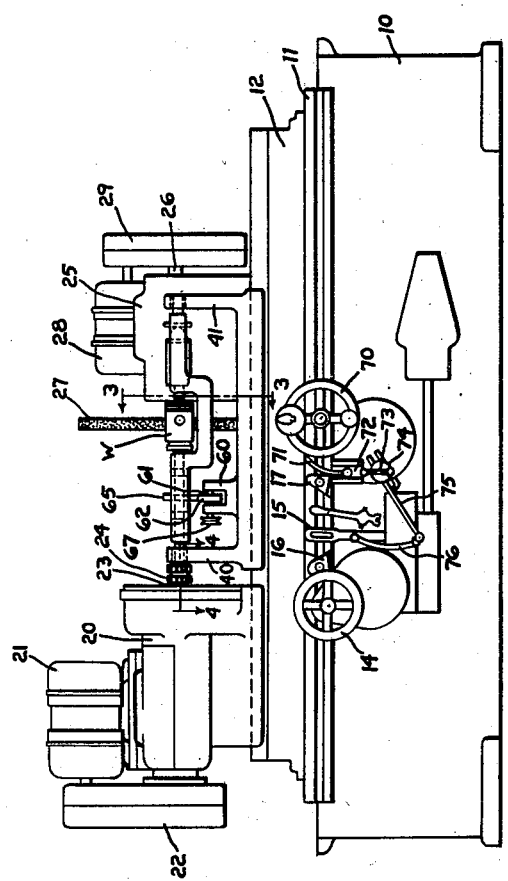

Referring first to Figure 1, the invention may be embodied in a lathe or a milling machine but has certain special advantages when embodied in a grinding machine and is so illustrated herein. I provide, therefore, any suitable machine tool structure, for example, as shown, a grinding machine base 10 upon which is mounted for reciprocation a carriage 11 upon which is fastened in any desired position of angular adjustment (within limits) a table 12. The machine provides any suitable apparatus reciprocating the carriage 11, many such mechanisms being now known in the art. For example, a hand wheel 14 may be used to move the carriage 11 on the base 10 or this may be done automatically by means of a power drive mechanism controlled by a reversing lever 15 mounted on the base 10 and interposed between table dogs 16 and 17.

The machine is further provided with a headstock 20 which is adjustably mounted upon the table 12. Upon the headstock 20 is mounted a motor 21 connected by suitable gearing in a casing 22 to a main spindle 23 journalled in the headstock on the end of which is fastened a sprocket gear 24.

The machine further is provided with a wheel head 25 constituting a cross slide mounted upon suitable ways in the base 10 which guide the cross slide in a direction perpendicular to the movement of the carriage 11. In the wheel head 25 is journalled a spindle 26 mounting a grinding wheel 27 which is driven by a motor 28 through the medium of a suitable belt driving mechanism in a casing 29.

Figure 3:
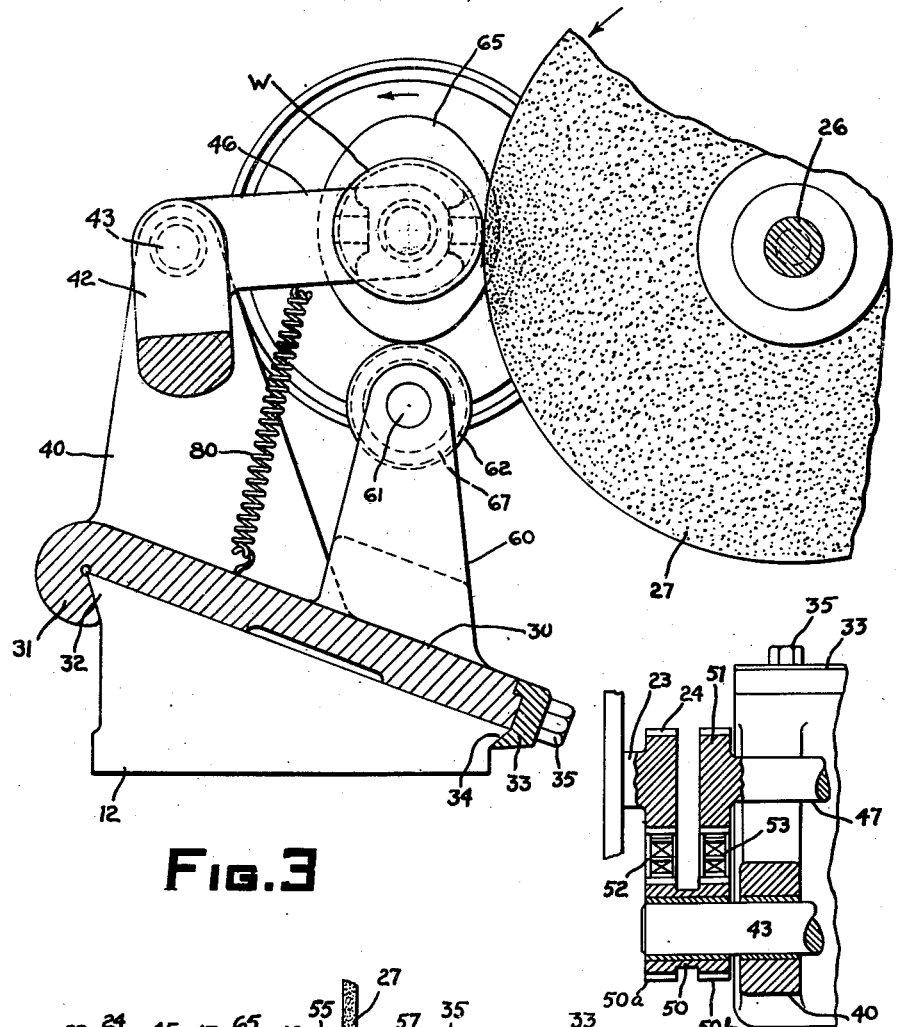
Figure 3 is a sectional view taken on the line 3—3 of Figure 1.
Figures 2, 4:
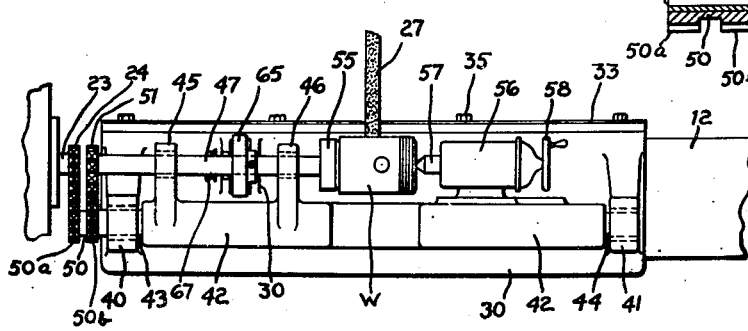
Figure 4 is a sectional view taken on the line 4—4 of Figure 1.

Referring now particularly to Figures 2 and 3 illustrating the attachment embodying many of the features of the invention, I provide an attachment base 30 which may be clamped in adjusted position along the table 12, as by means of an overhanging portion 31 fitting ways 32 on the upper side of the table 12 and gibs 33 fitting ways 34 also on the upper side of the table 12 but opposite the ways 32, the gibs 33 being secured by means of bolts 35. The base 30 has upstanding therefrom a pair of integral journals 40, 41 at the ends thereof. I provide a rock shaft 42 having trunnions 43, 44 extending into the journals 40 and 41. This rock shaft has integrally formed therewith journals 45 and 46 rotatably supporting a shaft 47 parallel to the axis of the rock shaft 42 but spaced therefrom as shown. Referring to Figure 4, the trunnion 43 mounts a double sprocket gear member 50, and a sprocket gear member 51 is formed on the end of the shaft 47. A sprocket chain 52 connects the sprocket 24 with the left-hand sprocket gear 50a while a sprocket chain 53 connects the right-hand sprocket gear 50b with the sprocket 51. Accordingly the shaft 47 is rotated from the main headstock spindle 23 but it may move up and down without interfering with this transmission of power.

Fastened to the right-hand end of the shaft 47 is a piston driving plate 55. The machine is shown equipped for grinding pistons but other work pieces might be substituted, this being a mere matter of providing a suitable driving dog or the like. Opposite the driving plate 55 is a tailstock 56 the main casting of which is attached to the rock shaft 42, this tailstock 56 having the usual tail center 57 which is movable along the axis of work rotation by means of the hand wheel 58.

Referring to Figures 1 and 3, a forked bracket 60 is attached to the base 30 and journals a shaft 61 supporting a master cam roller 62. Above this master cam roller 62 and fastened to the shaft 47 is the master cam 65.

As the tolerances in the construction of internal combustion engines became smaller, it was noted that pistons had a tendency to seize in the cylinders. This could not be corrected by the most careful work, whereupon it was discovered that the automotive piston does not expand uniformly. Consequently automotive manufacturers adopted shapes for the pistons which were non-circular, such as ellipses, or a pair of right circular cylindrical portions connected by elliptical portions. The difference between such shapes and a true right circular cylinder is so small that it is not apparent to the eye and is measured in thousandths of an inch. Consequently it has been difficult to shape these pistons correctly. One feature of the present invention involves the use of a master cam which moves the product piston vertically in order to vary the diameter thereof to shape it properly, such vertical motion changing its diameter by moving it arcuately tangent to the grinding wheel which causes the work piece to have a less exaggerated shape than the master cam by reason of the fact that one thousandth of an inch of downward movement will not pull the work piece one thousandth of an inch away from the grinding wheel. In fact, slight vertical movement of the work piece change its size by very minute amounts. It is thus possible to make a master cam which is exaggerated in shape as compared with the work piece and if it is wrong in shape, that fact can be more readily detected.

For the formation of the master cam 65, I remove the master cam roller 62 and place a grinding wheel upon the shaft 61. I also fasten a pulley 67 to the shaft 61 and mount a suitable motor, not shown, upon the grinding machine. On the armature shaft of this motor is a pulley connected to the pulley 67 by a belt. This rotates the grinding wheel which takes the place of and occupies the position of the cam roll 62. I then remove the grinding wheel 27 and substitute in place thereof a steel disk of the same diameter. I place a work piece W between the driving plate 55 and the tail center 57 which has been approved by the customer. I then energize the motor 21 which rotates the work piece W in the customary direction, as shown by the arrow in Figure 3. The disk taking the place of the grinding wheel 27 may be held stationary or may be rotated in the customary angular direction, as shown by the arrow in Figure 3. The grinding machine is equipped with the usual cross feed screw shaft, not shown, controlled by hand wheel 70 or automatically by a pawl 71 engaging a ratchet wheel fastened to the hand wheel 70 and operated by a slide 72, connecting rod 73 on disk 74 rotated by rack rod 75 connected to arm 76 fastened to the reversing lever 15, this mechanism being well known in the art. By means of this cross feed mechanism, I cause the wheel taking the place of the grinding wheel 27 to approach the work piece until contact with the largest diameter of the work piece is made. When the work piece engages the larger wheel, its own rotation or the rotation of the wheel or both combined urge it downwardly which carries master cam 65 into engagement with the grinding wheel taking the place of the master cam roller 62. This causes the master cam roller (which previous to this time is a circular blank) to be ground. Whenever a low spot in the sample work piece comes in front of the wheel taking the place of the grinding wheel 27, there is no grinding pressure. Therefore, gradual movement of the cross feed finally shapes a master cam 65 to the desired shape.

This master cam may now be carefully measured and by mathematical calculations the shape of the work piece W can be compared to the correct shape thereof called for by the detailed drawing therefor. If the master cam is found to be in error, stock may be removed or metal added by welding and grinding until the ideally perfect shape is reached. Such corrective operations can be performed more accurately than heretofore in the apparatus of the present invention owing to the exaggerated shape of the master cam.

When a roller 62 is substituted upon the spindle 61 and the grinding wheel 27 is placed on the spindle 26, any number of product work pieces W, such as pistons, may be ground to the exact shape desired as controlled by the master cam 65. One of the features of advantage of the present invention resides in the fact that grinding pressure is substantially constant. In previous machines the work piece has moved toward and from the grinding wheel and spring pressure, resilient pressure or the like has been caused to move it in one direction. A spring cannot exert constant pressure while the spring is being expanded and contracted alternately. The spring exerts more pressure when it is being expanded than when it is contracting. I may make use of a spring 80 to urge the journals 45 and 46 downwardly, but this spring acts at right angles to the grinding pressure and, therefore, its force is not a variable factor in the grinding operation or at least only to a negligible extent. Furthermore, there is less chattering and vibration when moving the work pieces substantially tangent to the grinding wheel rather than directly toward and from the grinding wheel.

It will thus be seen that there has been provided by this invention apparatus in which the various objects hereinabove set forth together with many thoroughly practical advantages are successfully achieved. As various possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In apparatus of the class described, a rotatable cutting tool, a work piece holding shaft parallel to the axis of said cutting tool, a master cam on said shaft, and a master cam roller whose axis is parallel to that of the shaft and located in a plane passing through the axis of said shaft substantially perpendicular to the plane containing the axis of said shaft and the axis of the rotatable cutting tool, whereby the work piece is moved substantially tangent to the grinding wheel to generate its shape, thereby permitting the use of an exaggerated cam.

2. In apparatus of the class described, a work piece rotating shaft, a master cam on said shaft, a master cam roller parallel to said shaft, and a cutting tool contacting the work piece at a point substantially in a plane of the shaft which is perpendicular to the plane connecting the axis of the shaft with the axis of the roller, whereby the work piece is moved substantially tangent to the grinding wheel to generate its shape, thereby permitting the use of an exaggerated cam.

3. In a grinding machine, a work head, a spindle in said work head, a rock shaft, a work driving shaft, a grinding wheel, the axes of said spindle, said rock shaft, said work drive shaft and said grinding wheel being parallel and substantially in a given plane with the work drive shaft and the spindle between the rock shaft and the axis of the grinding wheel, and means to move the work drive shaft up and down comprising journals therefor extending from the rock shaft, a master cam and a master cam roller, the master cam roller being fixed and located between the grinding wheel and the rock shaft and to one side of a line connecting the grinding wheel and the rock shaft and the master cam being located on the work drive shaft whereby the work piece is moved in an arcuate path substantially tangent to the grinding wheel to shape the work piece.

4. In apparatus of the class described, means to hold and rotate a work piece, a cutting tool positioned to contact the periphery of said work piece, and means including a master cam and a relatively stationary abutment to move the work piece in a direction substantially at right angles to a line connecting the contacting portion of the tool and the center of the work piece, thereby moving the work piece away from the tool in a tangential direction elongating the distance from the center of the work piece to the cutting point of the tool and causing the work piece to assume an irregular shape.

CLARENCE J. GREEN.